United States Patent [19]
Paulson

[11] Patent Number: 5,562,366
[45] Date of Patent: Oct. 8, 1996

[54] METHOD AND SYSTEM FOR FAST CYCLE TRANSPORT OF MATERIALS IN DENSE PHASE

[76] Inventor: Jerome I. Paulson, 969 Edinburgh Dr., Lancaster, Pa. 17601

[21] Appl. No.: 467,839

[22] Filed: Jun. 6, 1995

Related U.S. Application Data

[63] Continuation-in-part of Ser. No. 881,628, May 12, 1992, abandoned.

[51] Int. Cl.⁶ .................................................. B65G 53/66
[52] U.S. Cl. ................. 406/12; 406/28; 406/29; 406/50; 406/53; 406/56; 406/85; 406/95; 406/126; 406/146; 406/154; 406/168; 406/175; 406/191
[58] Field of Search ............... 406/53, 56, 61, 406/93, 94, 95, 154, 168, 169, 170, 171, 172, 173, 174, 175, 191, 10, 12, 14, 15, 16, 28, 29, 30, 50, 85, 126, 132, 133, 146; 137/508, 596.18, 596.2; 251/61.2

[56] References Cited

U.S. PATENT DOCUMENTS

| | | | |
|---|---|---|---|
| 1,935,843 | 11/1933 | Goebels | 406/16 |
| 2,330,164 | 9/1943 | Wiedenhoefer | 406/56 X |
| 2,577,967 | 12/1951 | Hughes | 251/61.2 X |
| 2,946,628 | 7/1960 | Bauregger | 406/95 |
| 3,295,896 | 1/1967 | Hurtig et al. | 406/50 X |
| 3,604,758 | 9/1971 | Flain et al. | 406/50 |
| 3,980,024 | 9/1976 | Futer | 406/93 |
| 4,025,121 | 5/1977 | Kleysteuber et al. | 406/94 X |
| 4,083,607 | 4/1978 | Mott | 406/171 |
| 4,183,702 | 1/1980 | Bonnel | 406/56 |
| 4,208,031 | 6/1980 | Jonak | 251/61.2 |
| 4,779,641 | 10/1988 | Charm et al. | 251/61.2 X |
| 4,958,656 | 9/1990 | Patel | 137/508 X |
| 5,252,007 | 10/1993 | Klinzing et al. | 406/94 X |

FOREIGN PATENT DOCUMENTS

| | | | |
|---|---|---|---|
| 2412142 | 9/1974 | Germany | 406/95 |
| 5-43051 | 2/1993 | Japan | 406/146 |
| 164560 | 8/1964 | U.S.S.R. | 406/126 |

*Primary Examiner*—Andrew C. Pike
*Attorney, Agent, or Firm*—Russell J. Egan

[57] ABSTRACT

A fast cycle system for transport of particulate material in dense phase has a feeder assembly dispensing material into a pulse pod assembly. The latter is connected to a pressurized pipeline and the pod of material is sent into the pipeline upon receipt of a pressure drop signal. Boosters spaced along the pipeline selectively vent and pressurize the pipeline driving the pod through to a receiver. The system including a receiving hopper and discharge valve in the receiving hopper for imparting, when actuated, peristaltic motion to the particulate material moving in the pipeline.

16 Claims, 6 Drawing Sheets

METHOD AND SYSTEM FOR FAST CYCLE TRANSPORT OF MATERIALS IN DENSE PHASE

BACKGROUND OF THE INVENTION

1. Cross Reference to Related Patent Application

The present application is a continuation-in-part of my earlier patent application Ser. No. 07/881,628 filed May 12, 1992 now abandoned.

2. The Field of the Invention

The present invention pertains to a method and system for transporting particulate material in dense phase over substantial distances and with fast cycling.

3. The Prior Art

It is well known that pneumatic conveying systems are particularly useful for transporting particulate materials, such as pellets of plastics materials. However, the existing pneumatic conveying techniques tend to be rather inefficient in that the ratio of energy consumption per pound of particulate material, which is transported, is quite high. In order to obtain any degree of efficiency, the system must be capable of moving large quantities of bulk solids from point A to point B through a pipeline with compressed air while, at the same time, maintaining the mixture in turbulent flow and preventing it from plugging the pipe. When particulate material is conveyed in this fashion and there is a high ratio of air to product, then this is referred to as operating in the "dilute phase" and requires high pick-up air velocity. The dilute phase technique achieves a substantially continuous transport of particulate material. A second technique involves filling a portion of the pipe with sufficient particulate material to substantially plug the pipe. Then enough pressurized air must be provided in a burst to push this plug of particulate material through the pipeline without converting it into dilute phase. This technique is called "dense phase" and, clearly, is a batch or discontinuous type of operation.

Both of the above described approaches to pneumatic conveying of particulate material are quantified by their respective ratios of solids to air, in pounds. For example, dilute phase is generally considered to be in the range of 0 to 10 pounds of solid material per pound of air while dense phase is generally considered in the higher range of 10 to 50 pounds of solid material per pound of air.

There are three distinct disadvantages associated with dense phase conveying, namely:

1. Complex and expensive equipment is required to feed the particulate material into the conveying line.

2. The expansion of the conveying air from the initial high pressure, at the feed end, to substantially atmospheric pressure, at the discharge end, can result in extremely high velocities being imparted to the particulate material at the point of discharge.

3. High in-feed pressures prevent continuous loading of the system so that the vast majority of all dense phase systems are discontinuous or batch type operations.

The particulate material conveying industry has a definite preference for dilute phase systems because of their relative structural and operational simplicity and ease of maintenance, not to mention that these systems cost up to 50% less than dense phase systems. However, dilute phase systems are not without their own disadvantages.

The disadvantages of dilute phase pneumatic conveying are:

1. High velocities are imparted to the particulate material at pick-up and this velocity can cause severe damage to the particulate material, during transport, as it impacts on the surface of the pipeline in addition to the pipeline suffering erosion, particularly when the particulate material being conveyed is abrasive in nature.

2. Frequent maintenance is required for the rotary airlock, required for feeding material into the system, and the other system components.

3. Air pollution prevention means, such as expensive dust collectors, are required due to the large volumes of air required for dilute phase transport.

A common disadvantage in both of the above described systems is the limited distance over which the particulate material can be conveyed, regardless of the phase. This distance can be increased by the addition of air to the system at spaced intervals. However, there are many problems associated with adding air along the transport pipe, such as the timing of the added air impulse and insuring that the added air will not adversely affect the phase of the flowing material, for example diluting dense phase transport into dilute phase.

Another related problem is dispensing of the particulate material into the feed hopper. There are many well known screw feeding devices, but all of these have the disadvantage of substantial length so that they require a significant amount of space for installation, mounting, and maintenance.

SUMMARY OF THE INVENTION

The present invention concerns a method and system for fast cycle dense phase transport of particulate material over substantial distances. A quantity of the particulate material is dispensed into a pulse pod assembly and then is moved through the pipeline as a substantially solid mass, or pod, by pressurizing the pipeline in such a manner as to cause a controlled low velocity movement of the mass or pod through the pipeline. A feed assembly assures a properly mixed, loosely compacted delivery of particulate material to the pulse pod assembly. Pressurized air is added at spaced intervals to sequentially advance the mass or pod of particulate material through the system. The pulse pod assembly has a three step operational sequence, namely loading or creation of a mass or pod of particulate material; transport of the mass or pod into the pipeline; and purging in preparation for loading the next mass or pod. A plurality of boosters are spaced along the pipeline to periodically and sequentially supplement the driving air to keep the mass or pod in constant movement through the system.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
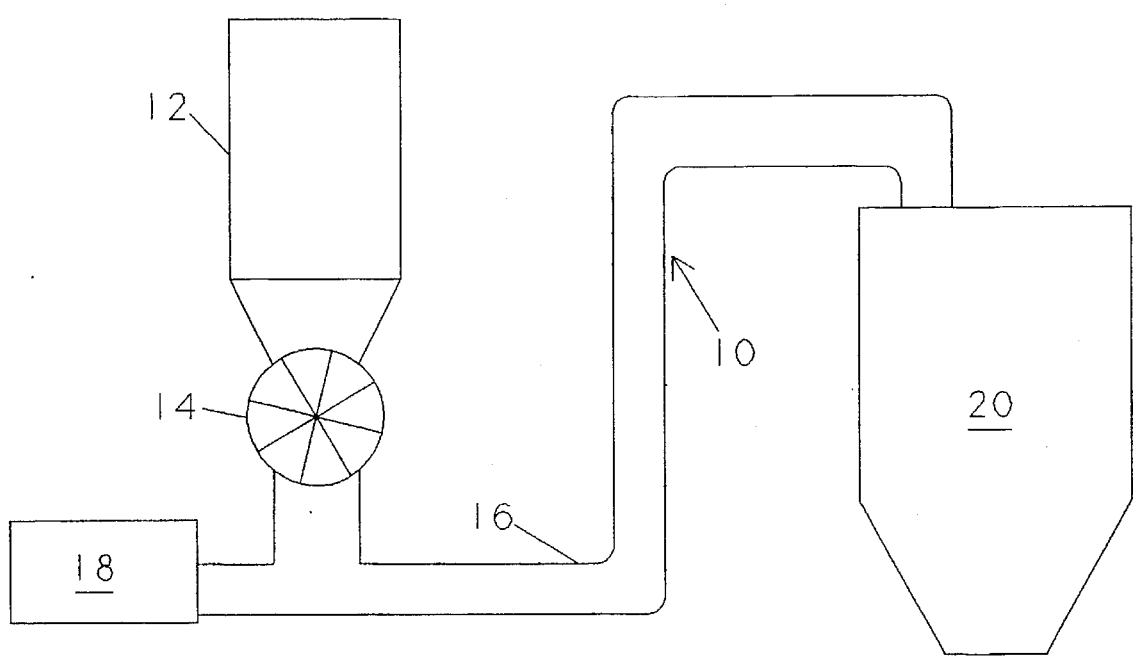
FIG. 1 is a schematic diagram of a typical prior art dilute phase system.
Figure 2:
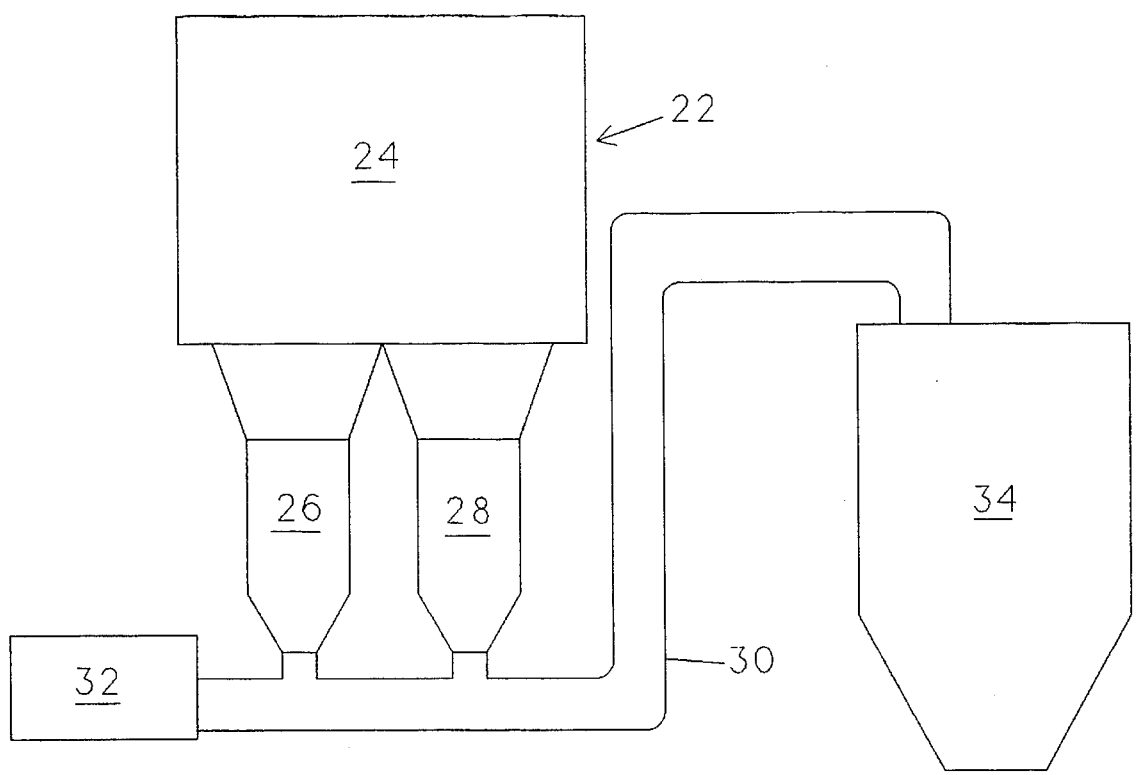
FIG. 2 is a schematic diagram of a typical prior art dense phase system.

Turning first to the prior art, FIG. 1 shows a typical dilute phase system 10 in which particulate material is loaded into hopper 12 and continuously fed through an air lock 14 to a pipe system 16 where pressurized air from source 18 causes the material to be conveyed to hopper 20 where it arrives at substantially atmospheric pressure. The dense phase system 22 of FIG. 2 has a single hopper 24 feeding a pair of charging hoppers 26, 28 which alternately discharge a plug of material into the feed line 30 where pressurized air from source 32 drives the plug of material to the receiving hopper 34. It is easy to make a comparison of the above discussed advantages and disadvantages of the two types of systems from these two figures.

Figure 3:
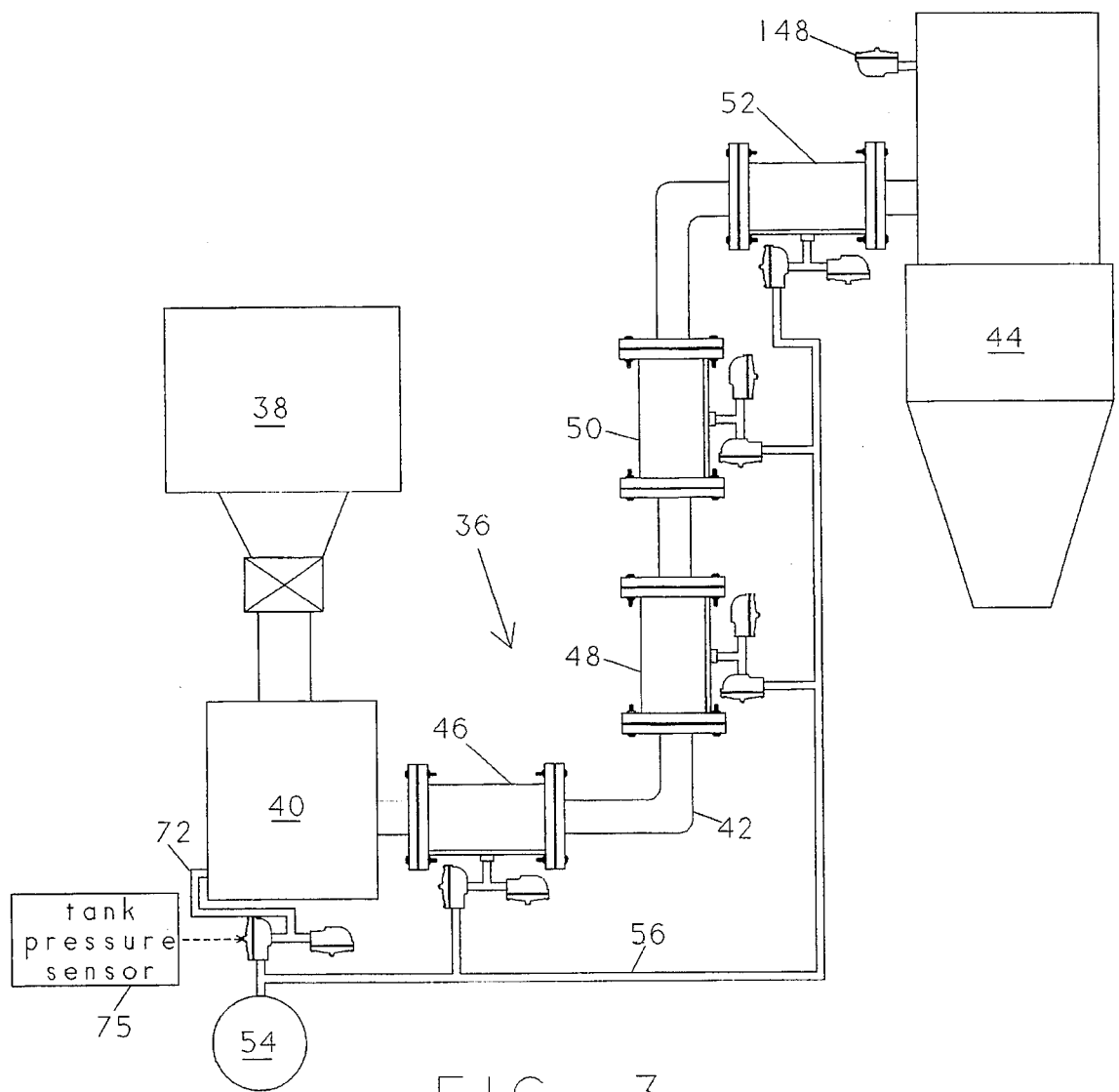
FIG. 3 is a diagrammatic view of the system of the present invention.

The system of the present invention is shown in diagrammatic form in FIG. 3. The subject invention 36 has a feeder assembly 38 connected for discharging particulate material directly into an inlet of pulse pod assembly 40. The outlet of pulse pod assembly 40 is connected to the inlet of a conveying or transport pipeline 42, the outlet of which is connected to the inlet of receiving hopper 44. A plurality of air pressure boosters 46, 48, 50, 52 are connected into and spaced along delivery pipeline 42. An air source tank 54 is connected to the pulse pod assembly 40 and boosters 46, 48, 50, 52 by means of control pipe 56.

Figure 4:
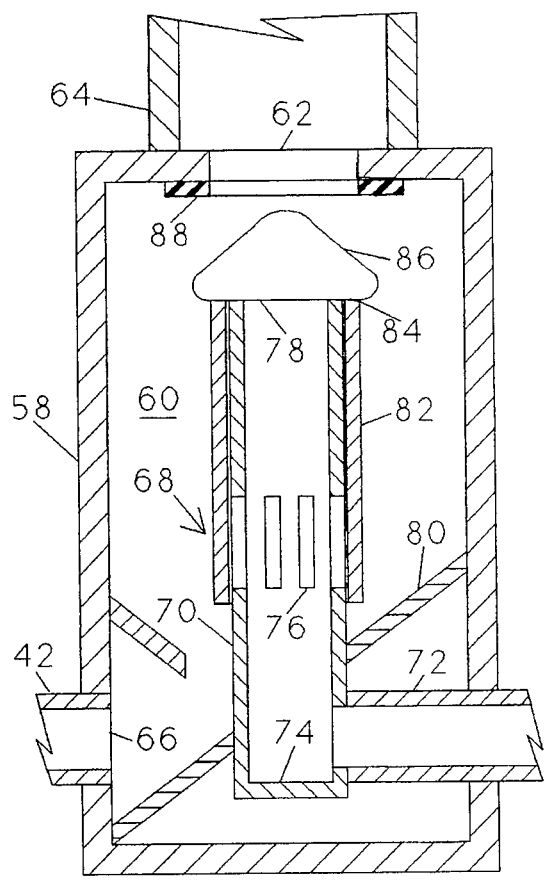
FIG. 4 is a side elevation, partially in section, of the pulse pod assembly of the subject invention in a loading mode.
Figure 5:
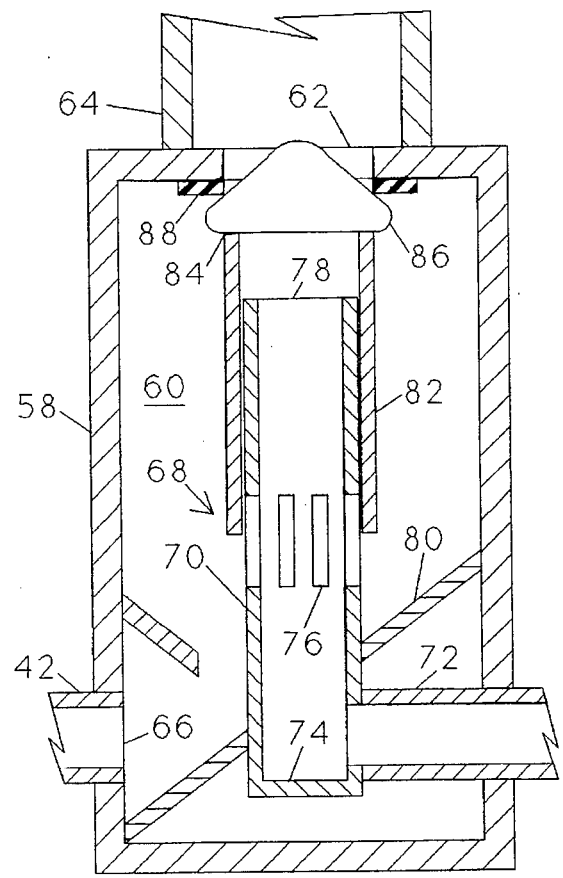
FIG. 5 is a side elevation, similar to FIG. 4, showing the pulse pod assembly of the subject invention in a transport mode.

The rapidly cycling pulse pod assembly 40 of the present invention is shown in detail in FIGS. 4 and 5 and includes a preferably cylindrical housing 58 defining a chamber 60 and having an inlet opening 62 connected to the particulate material feeder assembly (see FIG. 3) by inlet pipe 64. A discharge opening 66 is connected to conveying or transport pipeline 42.

A poppet valve assembly 68 is mounted substantially centrally of the chamber 60 and includes an inner cylindrical member 70 mounted substantially coaxially within the chamber 60. An air feed pipe 72 has one end entering into the inner member 70 adjacent a first closed or bottom end 74 and its opposite end connected to the air source 54. A plurality of apertures 76 are formed in spaced array about the periphery of and intermediate the ends of inner member 70. The upper end 78 of inner member 70 is open. The inner member 70 is fixedly mounted in the housing 58 by known means, such as first deflector plate 80 and air feed pipe 72. An outer cylindrical member 82 is loosely and slidably mounted on the inner cylinder member 70 and carries on its upper free end 84 a shaped valve member 86 which is adapted to engage annular seal 88 surrounding the inlet opening 62.

Figure 6:
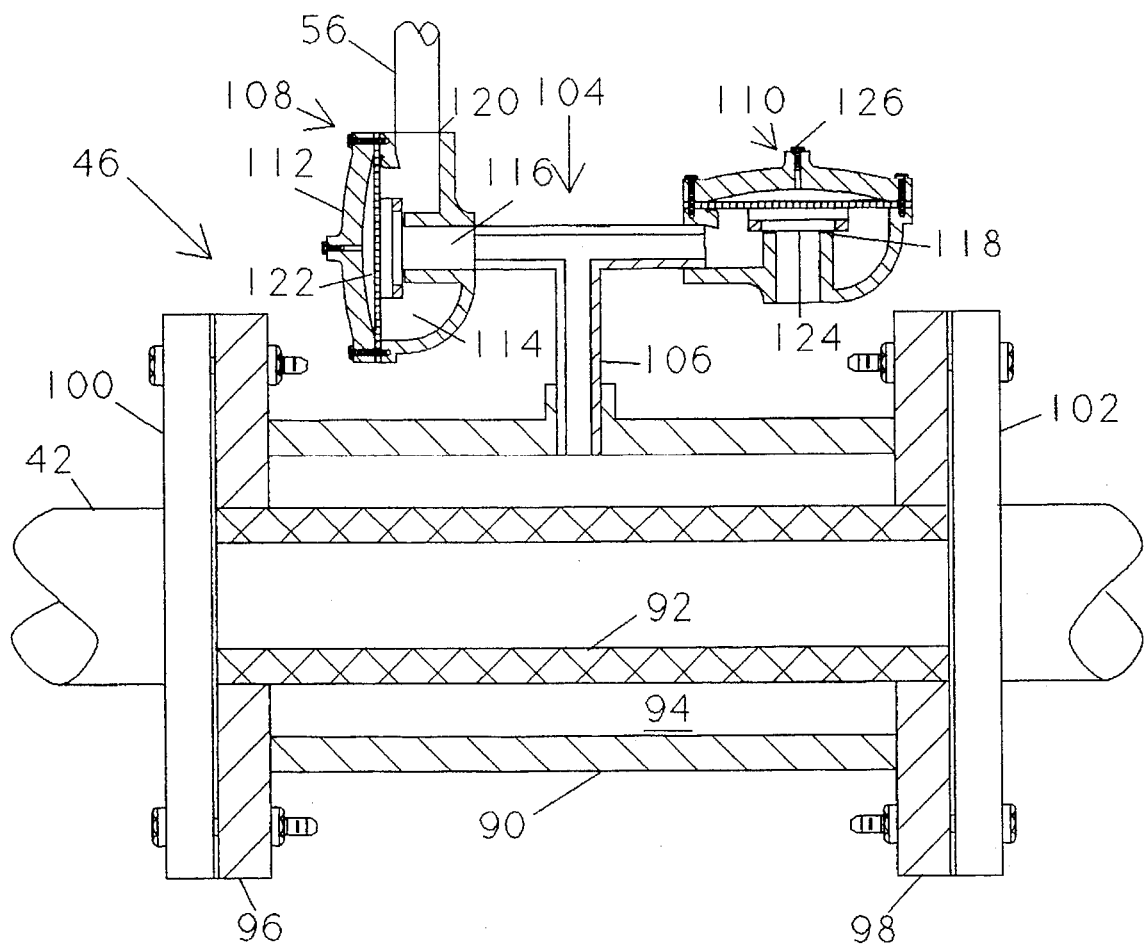
FIG. 6 is a partial vertical section through one embodiment of one of the air pressure booster assemblies of the present invention.

Booster 46, which is representative of all the boosters, is shown in detail in FIG. 6 and includes an outer housing pipe 90 and a porous inner pipe 92. The inner pipe 92 preferably has the same inner diameter as the transport pipeline 42 while the outer pipe 90 is somewhat larger to define an annular chamber 94 therebetween. The outer pipe 90 is provided with mounting flanges 96, 98 to engage with similar flanges 100, 102 on the transport pipeline 42 with appropriate known sealing means (not shown) therebetween. A control assembly 104 is mounted on each booster 46 in communication with the annular chamber 94. Each control assembly 104 includes a T-shaped pipe junction 106 with two identical control members 108, 110 mounted on the opposing arms of junction 106. Each control member 108, 110 has a housing 112 defining a chamber 114, an axial inlet 116 leading to the chamber 114 and forming a valve seat 118, and a radial inlet 120 opening into the chamber 114. A flexible diaphragm 122 is mounted for movement relative to the valve seat 118 to selectively open and close communication between the two inlets 116, 120. Gasket 124 is carried by the diaphragm aligned to engage the valve seat 118. Pilot signal means (not shown) are connected to the housing 112 through coupling 126 to control movement of the diaphragm 122. One of the control members 108 is connected to the junction 106 by its axial inlet 116 while its radial inlet 120 is connected to a source of pressurized air 54 (see FIG. 3) by line 56. The other control member 110 has its radial inlet 120 connected to the junction 106 while its axial inlet 116 is open to atmosphere.

Figure 7:
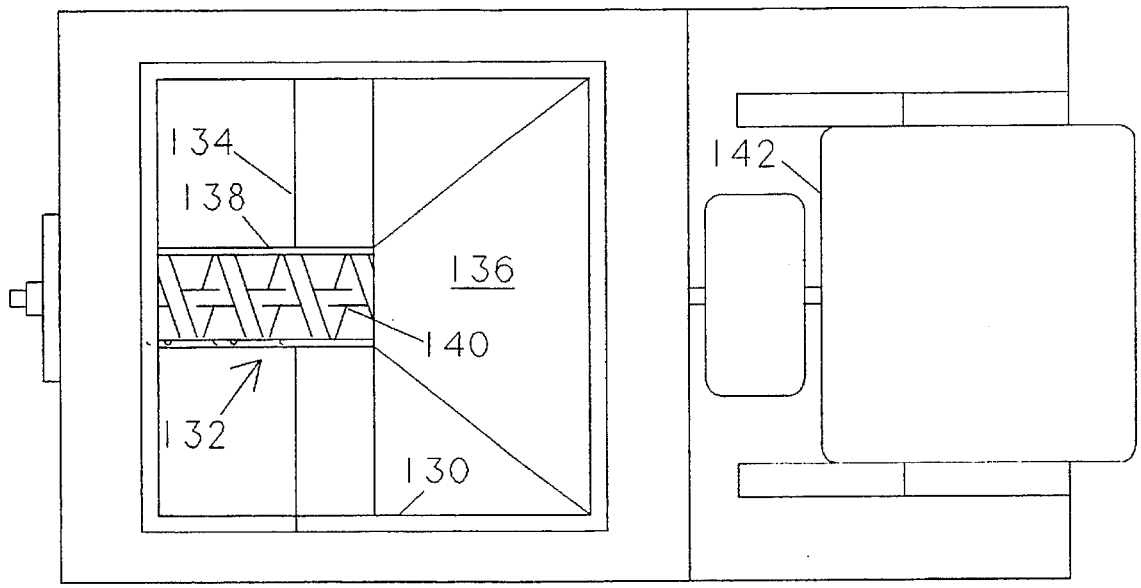
FIG. 7 is a top plan view of the feeder assembly of the present invention.
Figure 8:
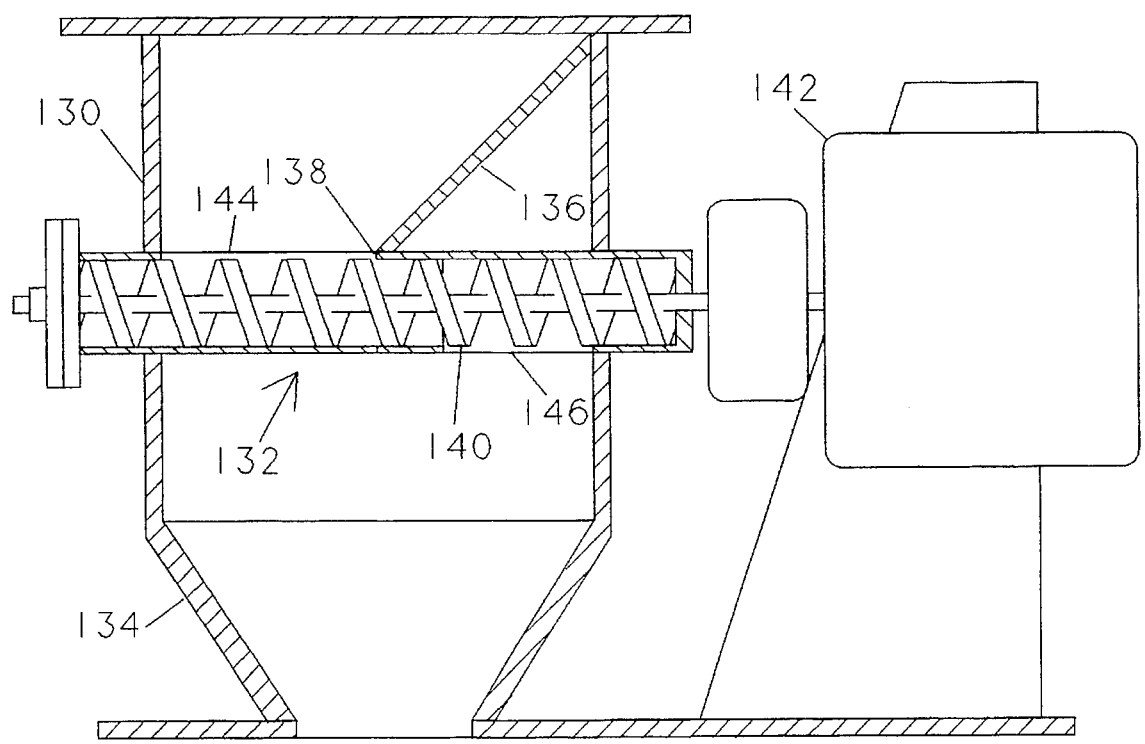
FIG. 8 is a vertical suction through the feeder assembly of FIG. 7.

FIGS. 7 and 8 show an embodiment 128 of feeder assembly 38 which is particularly useful in close quarter conditions. It includes an upper hopper 130, a transversely directed helical screw assembly 132 and a lower hopper 134. The upper and lower hoppers have substantially axially aligned vertical axes, as shown, to reduce the overall length of this feeder embodiment. The upper hopper 130 has an inclined inlet plate 136 which is axially offset along the length of the screw assembly 132. The screw assembly 132 has an elongated cylindrical tunnel 138 with a helical screw 140 rotatably mounted therein. The screw assembly includes screw drive means 142 outside of the tunnel and hoppers. The tunnel 138 has an upwardly directed inlet opening 144 and a downwardly directed outlet opening 146, with the openings being axially offset along the screw to be out of vertical alignment. The screw 140 receives particulate material from the upper hopper 130 through inlet opening 144, moves the particulate material axially to over the outlet opening 146 to drop through the lower hopper 134. Thus the screw 140 does not extend beyond the hopper and affords a compact design.

Operation of the pulse pod assembly of the present invention is rather simple. The automatic sequencing of the present invention is initiated by pneumatic control means (not shown). In the initial at rest or fill condition, as shown in FIG. 4, the pulse pod internal pressure is removed (supply air valves are closed) and the inlet poppet valve 68 is opened by gravity. The particulate material is allowed to fill the transport chamber for a preset period. A timer (not shown) holds the unit in the fill condition for an adjustable time cycle, usually from 1 to 7 seconds. At the end of this time period, a control means signals a conveying valve to open venting a diaphragm pilot (not shown) thereby pressurizing the chamber 60 which closes the poppet valve 68 and initiates the conveying cycle. The incoming air fluidizes the solids which are directed by deflector plate 80 and driven out of the chamber 60 through exit port 66 to transport pipe 42. The pressure continues to rise causing the product to flow smoothly through the transport line to the receiving hopper. The unit remains in the conveying mode until the pressure falls (indicating that the product has been delivered) to the empty line setting, which closes the conveying valve and initiates a subsequent fill cycle. A pressure sensor 75 monitors the source tank 54 and will hold the unit in the fill cycle until the tank has regained sufficient pressure for the next conveying cycle. This will insure that an adequate air supply is ready for the next pulse. The entire transport cycle will vary in relation to the conveying distance, but will range from 5 to 15 seconds, transporting 10 to 20 lbs of product in each pulse.

Thus the operation of the subject system is rather straight forward. In the fill or charge condition, FIG. 4, the inlet or poppet valve 68 has outer cylindrical member 82 resting against the open end 78 of the inner cylindrical member 70. This uncovers the inlet port 62 to allow the material to flow under the influence of gravity through input pipe 64 to at least partially fill the transport chamber 60. Feeding pressurized air axially into the poppet valve 68 drives the outer member 82 vertically up to engage the seal 88 allowing further pressurization of the chamber 60 and conveying of product in the chamber. The unit remains in the conveying mode until the pressure falls to an empty line setting which closes the conveying valve and initiates another fill cycle by the member 82 dropping, under the force of gravity, from the position shown in FIG. 5 to the position shown in FIG. 4.

A pressure sensor 75 monitors the surge tank 54 and will hold the poppet valve assembly 68 in the fill condition until the tank 54 has regained sufficient pressure for the next cycle. This will insure that an adequate air supply is ready for the next pulse. The entire transport cycle will vary in relation to the conveying distance but will range from 5 to 15 seconds transporting 10 to 20 pounds of product per pulse.

The boosters 46, 48, 50, 52 work in response to receipt of a pilot signal at coupling 126. The pneumatic lines for conveying this signal have not been shown for sake of clarity of the drawings. However, this is well known and could also be accomplished by a plurality of electrically operated valves connected to line 56 and tapping a small amount of pressure therefrom. This signal causes control member 108 to open and control member 110 to close so that pressurized air from the source tank 54 flows through member 108 and junction 106 into annular chamber 94, through the porous pipe 92 to add driving force to the air in the transport pipe 42.

Figure 9:
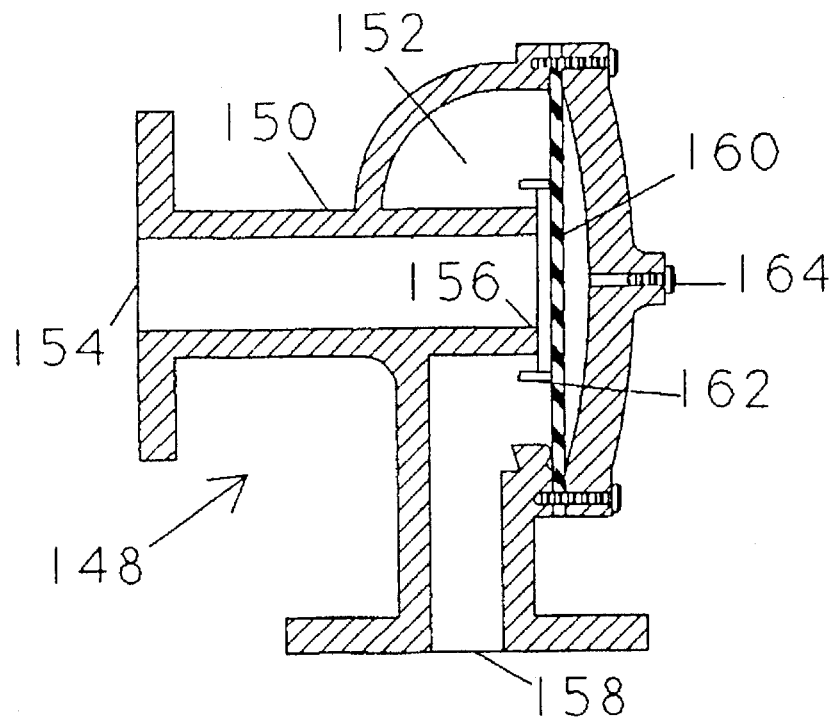
FIG. 9 is a vertical section through a discharge valve assembly for the subject invention, shown in the closed condition.
Figure 10:
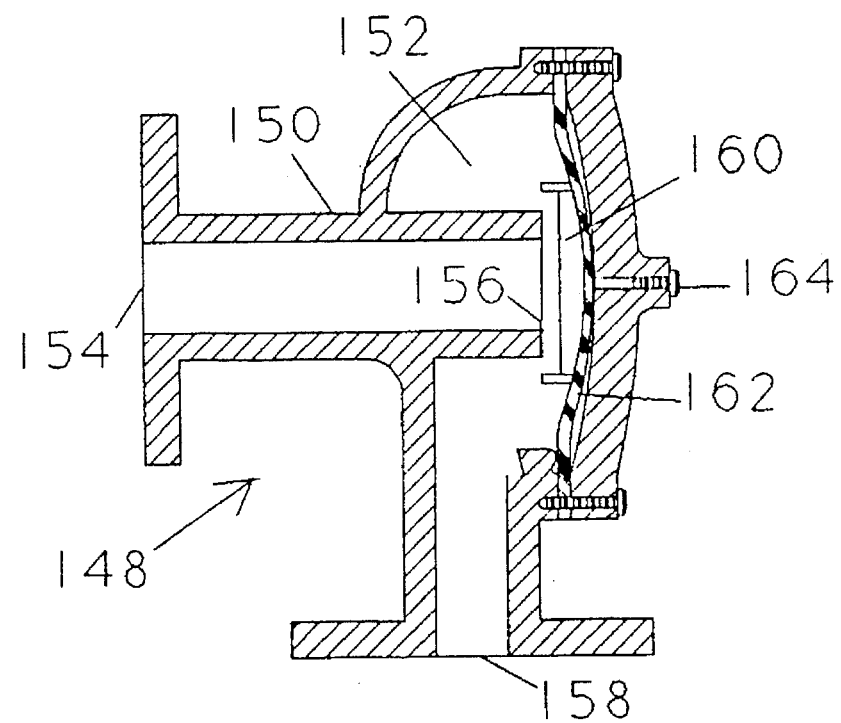
FIG. 10 is a similar vertical section showing the discharge valve of FIG. 9 in the open condition.

The receiver is an important part of the present invention as it controls the flow of the system. The pulse pod assembly feeding the pipeline is balanced by the controlled exit at the discharge valve 148 in the receiver. This discharge valve is shown in FIGS. 9 and 10 in the closed and opened positions, respectively. The discharge valve is similar in both structure and operation to half a booster control. The discharge control valve 148 has a housing 150 defining a chamber 152, an axial inlet 154 leading to the chamber 152 and forming a valve seat 156, and a radial inlet 158 opening into the chamber 152. A flexible diaphragm 160 is mounted for movement relative to the valve seat 156 to selectively open and close communication between the two inlets 154, 158. Gasket 162 is carried by the diaphragm 160 aligned to engage the valve seat 156. Pilot signal means (not shown) are connected to the housing 150 through coupling 164 to control movement of the diaphragm 160.

Fundamentally the subject system operates by moving a section of mass of pod of particulate material over a measured distance from one booster to the next by pressurizing the entire pipeline and selectively venting the next section which is to receive the mass or pod. The entire conveying pipeline is under pressure and operates by venting the pressurized air downstream of the mass or pod in a pattern which stimulates peristaltic motion beginning at the discharge receiver and rapidly moving in an upstream direction. It is expected that the cycle will travel at speeds up to 25 ft/sec or higher.

Opening and closing vents, thereby controlling pressure, will cause the mass or pod in the pipeline to move downstream in a rippling motion. The venting control will be rapid by sensing the downstream pressure and opening, very briefly, to maintain flow.

Important to smooth flow is the receiver, which controls the mass or pod discharge by periodically opening the discharge valve in timed sequence with the peristaltic control valve.

A unique feature of the subject system is the continuous pressurization of the pipeline. Material is caused to flow toward the low pressure zones which are produced by selective sequential control of the venting valves. The continuous pressure is maintained by valve means in the receiver which opens at the appropriate time to release material into the receiver from the conveying pipeline.

Once filed with product, the subject system actually starts by opening a discharge valve in the receiver, thereby creating a void in the pipeline which is filled by consecutively opening and closing peristaltic valves back to the pulse pod assembly. As described previously, the pulse pod assembly is filled by the momentary release of pressure during the fill cycle. The cycle then begins again by opening the discharge valve in the receiver.

Conveying distances can be enormous and the only limitation would be the ability to provide substantially uniform pressure throughout the length of the system. As an example, it would be possible to transport materially horizontally and vertically many thousands of feet.

Potentially it would be possible to move solids coast to coast in a pipeline, just as liquids and gases are now moved. Another advantage is that the pipeline will be completely filled with solids making this far more efficient than any other system which could contain some voids.

Existing systems can be converted to the subject system quite easily by installing peristaltic valves, a receiver, and a pulse pod assembly into an existing pipeline. The advantage would be an immediate increase in solids flow rates and reduction in operating horsepower. Each system would be evaluated for its individual advantages and cost savings.

A traditional dense phase system operating at +/−5 lbs of product per lb of air requires approximately 8 psig to transport a distance of 150' with 50' of vertical and four (4) 90° degree elbows. A 4" diameter pipe system will deliver 16,000 lbs/hr requiring 50 HP. The air volume would be approximately 550 SCFM. With the subject peristaltic system, the same requirements would be 10% or less of the standard dilute system. The peristalsis method will take the same system and increase the rate to as high as 40,000 lbs/hr using 69 to 148 SCFM at 60 psig.

The present invention may be subject to many modifications and changes without departing from the spirit or essential characteristics thereof. The present embodiment should therefor be considered in all respects as being illustrative and not restrictive of the scope of the invention as defined by the appended claims.

I claim:

1. A system for rapidly transporting large quantities of particulate material in dense phase, said system comprising:

particulate material feed means;

pulse pod assembly means for receiving the particulate material from said particulate material feed means and forming a dense phase pod of the particulate material to be transported, said pulse pod assembly means comprising:

housing means for defining an elongated chamber having a material inlet at a top end, and an air inlet and a material discharge outlet near a bottom end;

popper valve means mounted in said chamber to move axially to move reciprocally with respect to said material inlet for controlling said particulate material flowing from said feed means into said chamber; and pressurized air means connected to said air inlet for supplying pressurized air to said poppet valve means driving it upwards against and closing said material inlet, fluidizing said particulate material in said chamber, and conveying it out the material discharge outlet as the dense phase pod until pressure within the system drops, indicating delivery of the dense phase pod, and allowing said poppet valve means to reset to an open or fill condition;

means to sense air pressure within said pressurized air source means;

means responsive to said air pressure sensing means for preventing actuation of said pulse pod assembly means absent adequate air pressure within said air source means;

receiver means for receiving said particulate material;

transport pipeline means for connecting said pulse pod assembly means to said receiver means; and at least one air pressure booster spaced along and connected into said pipeline means;

wherein said pressurized air source mean is connected to each said at least one air pressure booster.

2. The system according to claim 1 wherein said particulate material feed means comprises:

an upper feed hopper;

a lower feed hopper; and a helical feed screw assembly mounted between and interconnecting said upper and lower feed hopper.

3. The system according to claim 2 wherein said upper and lower feed hoppers are substantially axially aligned; and said helical feed screw assembly has a helical feed screw rotatably mounted in a tunnel housing extending transverse to vertical axes of both said upper and lower feed hoppers, said tunnel housing having an upper inlet opening and a lower outlet opening horizontally displaced whereby the particulate material falling from said upper hopper enters said upper inlet opening and is carried laterally by said helical feed screw to exit through said lower outlet opening thereby substantially reducing an overall length of said particulate material feed means.

4. The system according to claim 1 wherein said chamber further comprises:

at least one deflector means for directing flow of the particulate material from said chamber.

5. The system according to claim 1, wherein said moppet valve means comprises:

a pair of loosely fitting, concentrically mounted, inner and outer cylinder members, said air inlet being connected to one end of the inner cylindrical member, said inner cylindrical member having a plurality of apertures in patterned array about a periphery thereof, said outer cylindrical member being movable relative to said inner cylindrical member to selectively cover and uncover said apertures, and valve head means carried by said outer member for engaging in said material inlet to control flow of said particulate material therethrough.

6. The system according to claim 1 wherein each said at least one air pressure booster comprises:

an outer housing pipe having means at each end for mounting in said pipeline means;

a porous inner pipe having an inner diameter substantially the same as that of said pipeline means and forming an annular chamber within said outer housing pipe; and control assembly means connected between said pressurized air source means and said annular chamber for selectively venting and pressurizing said pipeline means.

7. The system according to claim 6 wherein said control assembly means is pneumatic.

8. The system according to claim 6 wherein said control assembly means is connected to said pressurized air source means.

9. The system according to claim 1 wherein said receiver means comprises:

a receiving hopper; and discharge valve means in said receiving hopper for imparting, when actuated, peristaltic motion to said particulate material moving in said pipeline means.

10. A method for transporting particulate product in dense phase pods through a pipeline of a system comprising:

a pulse pod assembly having a housing defining a chamber with a product inlet on a top end, an air inlet near a bottom end, and a product outlet, and a poppet valve assembly vertically mounted within said chamber to be activated by air from said air inlet and to move reciprocally with respect to said product inlet; and means for sensing pressure of a source of pressurized air connected to said air inlet;

said method comprising the steps of:

allowing said poppet valve assembly to open under gravitational force to fill said chamber with said particulate product;

applying said pressurized air to said poppet valve assembly from said pressurized air source to close said product inlet and fluidize said particulate product in the chamber and to drive the fluidized product in a dense phase through said product outlet until a pressure drop is sensed, indicating delivery of the product, allowing the poppet valve assembly to open under gravitational force; and further in response to said air pressure sensing means sensing low pressure in said pressurized air source, preventing actuation of said pulse pod assembly.

11. The method according to claim 10 wherein the system further comprises: particulate material feed means having an upper feed hopper, a lower feed hopper, and a helical feed screw assembly mounted between and interconnecting said uppper and lower feed hoppers; said method further comprising:

feeding said particulate product through said feed means to said pulse pod assembly.

12. The method according to claim 11 wherein said upper and lower feed hoppers are substantially axially aligned and said helical feed screw assembly has a helical feed screw rotatably mounted in a tunnel housing extending transverse to vertical axes of both said upper and lower feed hoppers, said tunnel housing having an upper inlet opening and a lower outlet opening horizontally displaced; said method further comprising:

moving said particulate product falling substantially vertically from said upper hopper into said upper inlet opening laterally by said helical feed screw to said lower outlet opening and allowing it to fall therefrom.

13. The method according to claim 10 wherein the system further comprises:

at least one air pressure booster connected into said pipeline, each said at least one air pressure booster having an outer housing pipe with means at each end for mounting in said pipeline, a porous inner pipe having all inner diameter substantially the same as that of said pipeline and defining an annular chamber inside said outer housing pipe, and air pressure booster control means; said method further comprising:

selectively venting and pressurizing said pipeline with said air pressure booster to move the pods of particulate product in dense phase through said pipeline.

14. The method according to claim 13 further comprising pneumatically actuating said air pressure booster control means.

15. The method according to claim 13 wherein said air pressure booster control means is connected to said pressurized air source.

16. The method according to claim 10 wherein said system further comprises: receiver means having a receiving hopper and discharge valve means in said receiving hopper for imparting, when actuated, peristaltic motion to said particulate product moving in said system; said method further comprising:

actuating said discharge valve means to impart said peristaltic motion.

* * * * *